United States Patent [19]
Ferrentino

[11] 4,185,887
[45] Jan. 29, 1980

[54] OPTICAL FIBER CABLE

[75] Inventor: Antonio Ferrentino, Monza, Italy

[73] Assignee: Industrie Pirelli Societa per Azioni, Milan, Italy

[21] Appl. No.: 468,765

[22] Filed: May 10, 1974

[30] Foreign Application Priority Data

Jun. 1, 1973 [IT] Italy ................ 24925 A/73

[51] Int. Cl.² ................................ G02B 5/16
[52] U.S. Cl. .................................. 350/96.23
[58] Field of Search ............ 350/96 R, 96 B, 96 WG, 350/96.23

[56] References Cited

U.S. PATENT DOCUMENTS

| | | | |
|---|---|---|---|
| 3,265,480 | 8/1966 | Hicks, Jr. | 350/96 B X |
| 3,660,590 | 5/1972 | Conant | 350/96 B X |
| 3,740,116 | 6/1973 | Andrews, Jr. | 350/96 B |
| 3,766,307 | 10/1973 | Andrews, Jr. | 350/96 B X |
| 3,887,265 | 6/1975 | Margolis et al. | 350/96 B |

Primary Examiner—Stewart J. Levy
Attorney, Agent, or Firm—Brooks, Haidt, Haffner & Delahunty

[57] ABSTRACT

An optical fiber band comprising an optical fiber intermediate and equi-distant from a pair of metal wires, each having substantially the same temperature coefficient of expansion as the optical fiber, embedded in a synthetic thermoplastic material and cables formed therewith. In one embodiment of a cable, a plurality of bands are bunched together and surrounded by a thermoplastic sheath. In another embodiment, a plurality of bands are disposed in side-by-side relation and preferably, secured together and a plurality of such bands are wound helically in successive layers around a supporting core, such as wire rope, and are covered by a thermoplastic sheath. Also, processes for forming the bands by extruding the thermoplastic over the fiber and wires or by sealing the fiber and wires between a pair of thermoplastic films.

16 Claims, 4 Drawing Figures

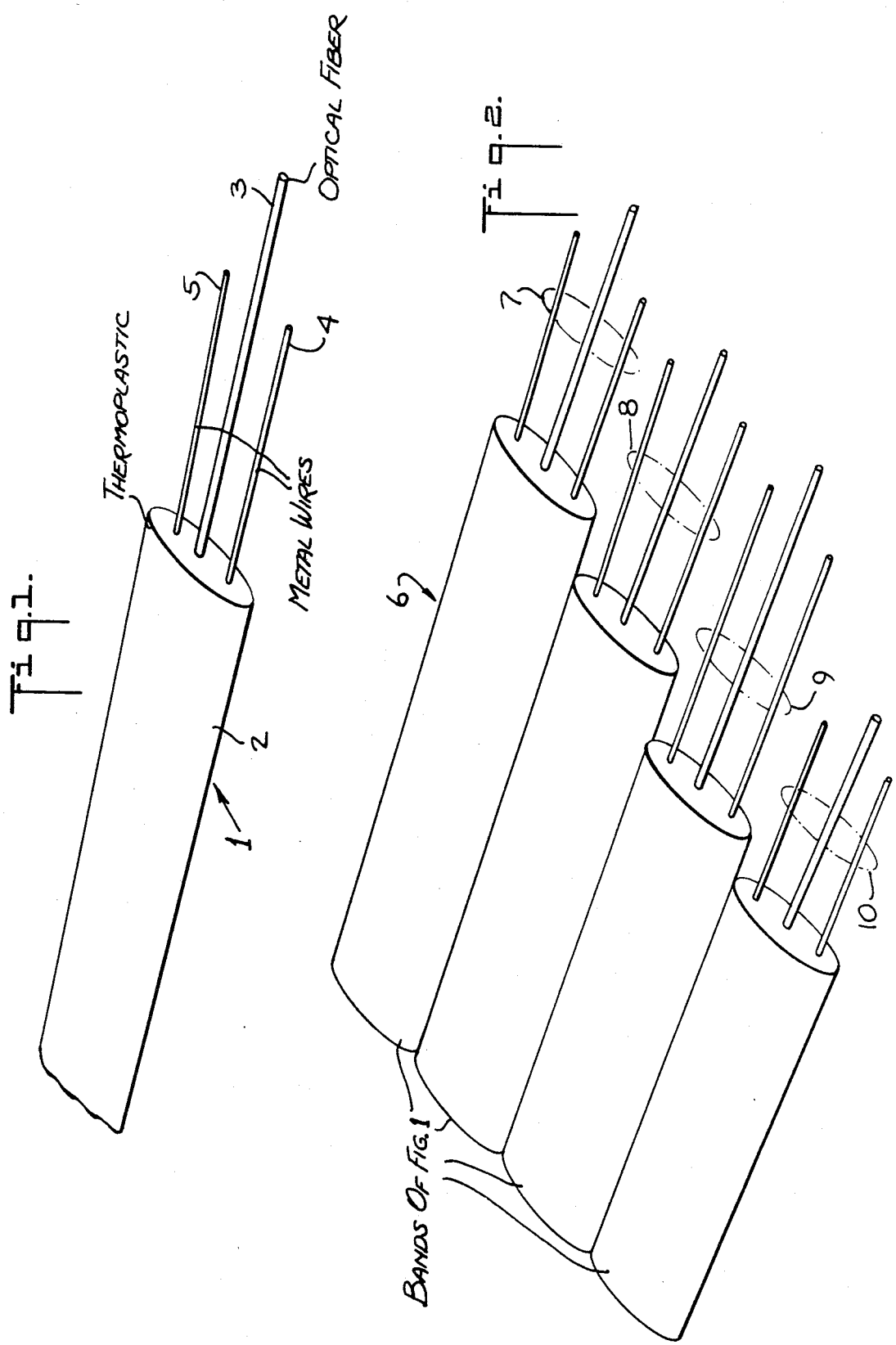

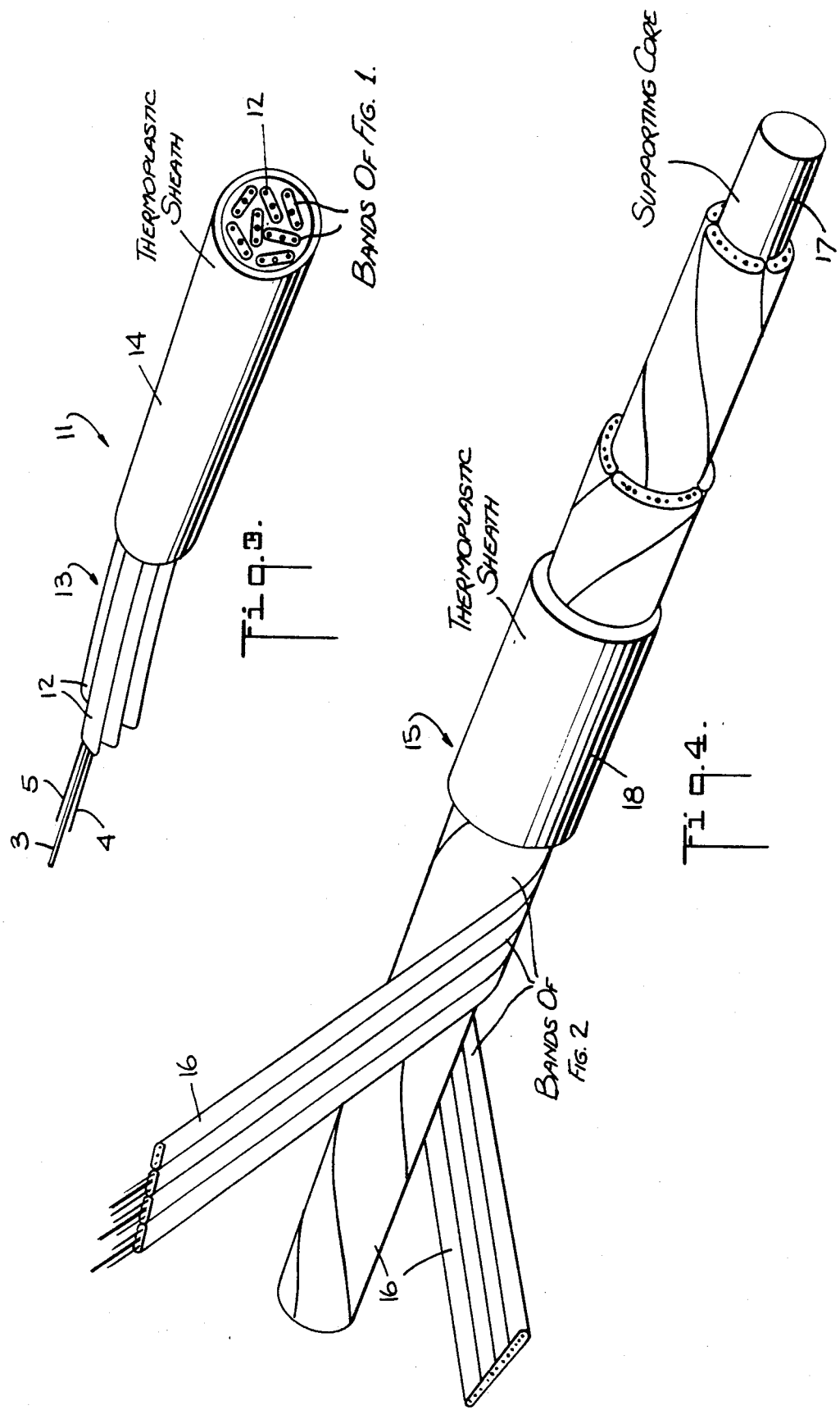

OPTICAL FIBER CABLE

The present invention relates to an optical fiber cable for transmitting signals and which is particularly useful as a telecommunication cable.

As is known in the art, optical fibers are fibers of glass or of synthetic plastic material, having a very small diameter, of the order of 0.1 to 0.01 mm, and comprise a tubular core and a sheath, the index of refraction of the sheath being smaller than that of the core, for example, from 1.50 to 1.52 as compared to 1.56 to 1.64 for the core. Owing to this difference in the index of refraction, light, entering one end of the fiber, is totally reflected inside the fiber itself and can be transmitted along the axis of the fiber, even if the fiber is curvilinear, as far as the other end of the fiber. By employing particular types of highly transparent glass, it has been possible to transmit the light from one end of the fiber to the other with very little attenuation.

Optical fibers of this type can be of interest also as a means for the transmission of signals in telecommunication systems. Their employment involves, however, some problems, chiefly deriving from the typical physical and mechanical properties of said fibers. In fact, it must be taken into account that although these fibers, which are extremely thin, can resist in a satisfactory way tension stresses applied thereto, such fibers have a low ultimate elongation, and are, therefore, brittle. It follows that, in order to use them in telecommunication cables, in which they are to be grouped together in a unit to constitute the means for transmitting signals, it is first of all necessary to solve the problems involved in distributing them uniformly and limiting the deformations and the stresses which can act on the fibers both during the cable construction and during its laying and service, in order to ensure that all of the fibers forming the unit may remain uninterrupted.

A further problem is the difficulty of being able to identify, in the transmission system formed by a unit of a plurality of fibers, the many incoming and outgoing ends, as is normally required in conventional telecommunication cables.

Applicants have discovered that it is possible to eliminate the hereinbefore described problems and thereby make it possible to use in an appropriate manner optical fibers as a means for transmitting signals in telecommunication systems.

One object of the present invention is a composite band of predetermined length, particularly suitable to be used as a means for transmitting signals in telecommunication systems, characterized in that it comprises a matrix of synthetic thermoplastic material into which is embedded, symmetrically arranged with respect to the axes of symmetry of said band, at least one series of three filiform elements of equal diameter, respectively constituted by an optical fiber and by two metallic wires, said fiber being equidistant from said wires and the latter being made of a metal having a coefficient of linear expansion of the order of that of the optical fiber.

Preferably, the composite band described hereinbefore is constituted by a single series of three filiform elements. Said composite band affords several advantages. First of all, it is possible to have a pre-established position of the optical fiber since it is embedded in the matrix of synthetic thermoplastic material. Secondly, the equi-distant position of the fiber with respect to the metallic wires has the result that, when the band is subjected to tension or bending within the elastic limits of the matrix, the optical fiber is only slightly stressed.

The metallic wires which form part of the composite band according to the invention are constituted, as stated hereinbefore, of a metal having a coefficient of expansion of the order of that of the material constituting the optical fiber. In practice, with optical fibers made of glass, use is made of wires of metal alloys, such as, for example, steel containing about 42% of nickel. Said metallic wires can have a diameter of the same order as that of the optical fiber employed, namely, of a value ranging from 0.1 to 0.01 mm, and the composite band may have a total thickness smaller than one millimeter.

The synthetic thermoplastic material forming the matrix embedding the series of filiform elements can be a polyolefine, such as polyethylene, or a polyamide or a polyester. When the composite band of the invention is employed as a means for transmitting signals in telecommunication cables, it preferably is used together with other analogous composite bands. As will be explained hereinafter, it is necessary to shield the optical fiber in the composite band in order to avoid alteration or disturbance of the transmission of light by light emitted from the optical fibers contained in the adjacent composite bands. For this purpose, the matrix of the composite band is formed with synthetic thermoplastic material preferably loaded with carbon black.

The composite band according to the present invention may be obtained by means of conventional manufacturing processes. More particularly, the series of the three filiform elements may be covered by extrusion with the synthetic thermoplastic material or, alternatively, it may be sandwiched between two films of said synthetic thermoplastic material, previously heated at a temperature higher than the softening point of the material itself, so that, during a subsequent phase in which the unit is subjected to pressure, the two films are sealed together, embedding therebetween the filiform elements, the latter process being described in U.S. Pat. No. 3,937,559 issued Feb. 10, 1976 and entitled "OPTICAL FIBER CABLE AND MANUFACTURE THEREOF", said patent being assigned to the assignee of this application.

On the other hand, if it is wished to form a composite band with more than one series of filiform elements, either of the two above indicated processes can be followed, and then several composite bands arranged side-by-side and each containing a series of filiform elements can be joined together by a heat treatment. Alternatively, the plurality of series of filiform elements can be directly prepared in side-by-side arrangement and then they can be sandwiched between two films of the synthetic thermoplastic material, as described hereinbefore.

As previously pointed out, by means of the composite band formed according to the present invention and obtained with the described processes, it is possible to provide means for the transmission of signals in the form of a telecommunication cable including such bands. Consequently, a further object of the present invention is a telecommunication cable comprising, as a means for the transmission of signals, at least one composite band of the construction previously described.

Preferably, said cable is built up by stranding together several composite bands in the form of bunches or distributed around a central core. To facilitate the identification of the various incoming and outgoing ends of the optical fibers, said composite bands can be provided with suitable marks, such as symbols or colors.

If the composite band is formed by more than one series of filiform elements, it can be used by itself as the means for the transmission of signals, and hence, as a band or flat telecommunication cable.

The present invention will be better understood from the following detailed description of preferred embodiments thereof, which description should be considered in conjunction with the accompanying drawings, in which:

FIG. 1 is a perspective view illustrating a composite band of the invention which contains a series of three filiform elements, part of the band being removed to better show the elements;

FIG. 2 is a partly broken away, perspective view of an alternative embodiment of the invention which contains several series of filiform elements;

FIG. 3 is a partly broken away, perspective view of a telecommunication cable which includes several composite bands of the type shown in FIG. 1 stranded together in a bunch; and FIG. 4 is a perspective view of a partly formed cable which comprises several composite bands of the type shown in FIG. 2 stranded around a central core.

In FIG. 1, the composite band 1, constituted by the matrix 2 of a synthetic thermoplastic material loaded with carbon black, having a thickness smaller than 1 mm, surrounds a series of filiform elements, namely, an optical fiber 3 and a pair of steel wires 4 and 5.

FIG. 2 illustrates a composite band 6, containing four series 7, 8, 9 and 10 of filiform elements positioned in side-by-side arrangement.

FIG. 3 illustrates a telecommunication cable 11 for the transmission of signals, which is formed by stranding together several composite bands 12 according to the present invention. In particular, the composite bands 12 forming the strand 13 are covered with a thermoplastic sheath 14. Each of said bands 12 has the optical fiber 3 and the steel wires 4 and 5 embedded therein in the manner illustrated in FIG. 1.

FIG. 4 illustrates another embodiment of a telecommunication cable 15 formed by stranding together, in side-by-side relation, several composite bands 16 of the type shown in FIG. 2. The bands 16 are wound in successive layers about a central core 17 which may be a rod of flexible plastic material or a steel rope, the central core 17 providing resistance to tension stresses. The bands 16 are protected by a thermoplastic sheath 18.

It will be noted from the description set forth that the various aspects of the invention permit the solving of the main problems which arise in the employment of optical fibers as a means for transmitting signals in telecommunication cables. The arrangement of the fibers in the band is, in fact, ordered, and marking of the bands permits easy identification of a certain band in the cable which provides means for transmitting signals.

The position of the optical fiber, which is equidistant from each of the metal wires inside the composite band, provides the advantage that the fiber is subjected only slightly to compression and bending stresses both during the preparation of the stranded cable and during the laying and the operation of the cable. The metal wires 4 and 5 preferably are made of an iron-nickel alloy, of the invar type, in which the proportion of the two metals, iron and nickel, is chosen so that the wire has the same coefficient of linear expansion as the glass or the material forming the optical fiber 3.

In addition to the advantages mentioned hereinbefore, the practical embodiment of a telecommunication cable using composite bands as described hereinbefore facilitates, to a considerable degree, the connection of the optical fibers contained in said bands to the terminal ends for the cable.

Although preferred embodiments of the present invention have been described and illustrated, it will be understood by those skilled in the art that various modifications may be made without departing from the principles of the invention.

What is claimed is:

1. A composite optical fiber band which is wide relative to its thickness and which has surfaces defining its thickness which will provide a generally flat band, said band comprising at least one, light transmitting fiber and a plurality of metal wires embedded in a band of a synthetic thermoplastic resin and in contact with said resin, said fiber and said wires having diameters of substantially the same order and temperature coefficients of linear expansion of substantially the same order, said wires being disposed on opposite sides of each said fiber to povide a single optical fiber between pairs of wires and said wires being spaced and separated from each said fiber by substantially equal distances and said wires also being spaced and separated from each other with portions of said resin of said band intermediate said wires and intermediate and in contact with said wires and said fiber whereby relative movement between said wires and said fiber is resisted by the contact of the resin therewith and said wires cause the stresses to which said fiber would be subjected when the band is subjected to tension and bending within the elastic limits of the band to be only slight.

2. A composite band as set forth in claim 1, wherein said band of resin is symmetrical in cross-section about a pair of mutually perpendicular planes extending longitudinally of said band, said fiber is disposed at the intersection of said planes and said wires are disposed in one of said planes.

3. A composite band as set forth in claim 1, wherein the portions of said band at opposite ends of the width dimension are the sides of said band, and further comprisng at least one additional band of the same construction as said first-mentioned band secured at its side to a side of said first-mentioned band.

4. A composite band as set forth in claim 1, further comprising additional similar fibers and metal wires embedded in said band of resin, said additional wires being spaced and separated from each other and from said first-mentioned wires by said resin of said band and each of said additional fibers being disposed intermediate and equidistant from a pair of said additional wires.

5. A composite band as set forth in claim 1, wherein the thickness of said composite band is less than one millimeter.

6. A composite band as set forth in claim 1, wherein said band of resin contains carbon black.

7. A composite band as set forth in claim 1, wherein said thermoplastic resin is selected from the group consisting of polyolefines, polyamides and polyesters and mixtures thereof.

8. A composite band as set forth in claim 7, wherein the metal of said wires is an alloy of iron and nickel.

9. A telecommunication cable comprising a plurality of composite optical fiber bands adjacent to each other, each band comprising an optical fiber and a pair of metal wires embedded in a band of a synthetic thermoplastic resin, said fiber and said wires having substantially diameters of the same order and temperature coefficients of linear expansion of the same order and said wires being disposed on opposite sides of said fiber and being spaced from said fiber by substantially equal distances.

10. A cable as set forth in claim 9, further comprising a sheath of thermoplastic resin surrounding said bands.

11. A cable as set forth in claim 9, wherein said bands are stranded.

12. A cable as set forth in claim 9, wherein said cable further comprises a supporting core and said bands are helically wound around said core.

13. A cable as set forth in claim 12, wherein said bands are wound around said core in a plurality of layers, each of said layers comprising a plurality of said bands in side-by-side relation and helically wound around said core.

14. An optical cable comprising a central elongate non-optical reinforcing member; a plurality of elongate optical elements, each element consisting of at least one optical fibre which elongate optical elements are embedded side by side in a substantially flat tape of plastics material which is lapped helically about the reinforcing member in at least one layer; and an outer protective sheath; the position of each elongate optical element with respect to the other elongate optical elements of the or each layer being constant throughout the length of the cable, and the reinforcing member being of such a material and of such a cross-sectional area having regard to the material or materials and cross-sectional area of each optical fibre that the reinforcing member at least substantially reduces the strain that would otherwise be imparted to the optical fibres when the cable is stressed in such a way as to tend to subject any optical fibre to a tensile force.

15. An optical cable comprising a central elongate non-optical reinforcing member; a plurality of elongate elements comprising at least one optical fibre which elongate elements are embedded side-by-side in a substantially flat tape of plastics material which is lapped helically about the reinforcing member in at least one layer; and an outer protective sheath; the position of each elongate optical element with respect to the other elongate optical elements of the or each layer being constant throughout the length of the cable; and the reinforcing member being of such a material and of such a cross-sectional area having regard to the material or materials and cross-sectional area of each optical fibre that the reinforcing member at least substantially reduces the strain that would otherwise be imparted to the optical fibres when the cable is stressed in such a way as to tend to subject any optical fibre to a tensile force.

16. An optical cable as set forth in claim 15 wherein each optical element has a non-optical reinforcing element at each side thereof.

* * * * *